US008140581B2

(12) United States Patent
Flynn et al.

(10) Patent No.: US 8,140,581 B2
(45) Date of Patent: Mar. 20, 2012

(54) CONFIGURABLE VIEW ON DATA MODELS

(75) Inventors: James Randall Flynn, Seattle, WA (US); Siddharth Jayadevan, Seattle, WA (US); Laurent Mollicone, Kirkland, WA (US); Anthony Scott Williams, Mercer Island, WA (US); Michael Charles Murray, Seattle, WA (US); Florian W. H. Voss, Seattle, WA (US); Stephen Michael Danton, Seattle, WA (US); Scott M. Roberts, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 12/121,755

(22) Filed: May 15, 2008

(65) Prior Publication Data
US 2009/0284549 A1 Nov. 19, 2009

(51) Int. Cl.
G06F 17/30 (2006.01)
(52) U.S. Cl. ........................................ 707/793; 345/619
(58) Field of Classification Search .................. 707/804, 707/805, 793, 796
See application file for complete search history.

(56) References Cited

U.S. PATENT DOCUMENTS

| 4,447,888 A | 5/1984 | Kuecker |
| 4,862,410 A | 8/1989 | Fukunaga |
| 5,050,105 A | 9/1991 | Peters |
| 5,212,771 A | 5/1993 | Gane |
| 5,307,493 A | 4/1994 | Gusenius |
| 5,513,305 A | 4/1996 | Maghbouleh |
| 5,596,704 A | 1/1997 | Geddes |
| 5,694,608 A | 12/1997 | Shostak |
| 5,754,859 A | 5/1998 | Long |
| 5,825,355 A | 10/1998 | Palmer et al. |
| 5,940,615 A | 8/1999 | Novick |
| 6,018,738 A | 1/2000 | Breese et al. |
| 6,049,335 A | 4/2000 | Lida |
| 6,055,327 A | 4/2000 | Aragon |
| 6,098,072 A | 8/2000 | Sluiman |
| 6,110,223 A | 8/2000 | Southgate et al. |
| 6,160,549 A | 12/2000 | Touma et al. |
| 6,167,455 A | 12/2000 | Friedman et al. |

(Continued)

FOREIGN PATENT DOCUMENTS
WO WO2006096792 9/2006

OTHER PUBLICATIONS

Oculus Info, Inc., "Using Oculus.NET For Your Business Data Visualization Solutions: A Technical Overview", 2007, pp. 1-17.*

(Continued)

*Primary Examiner* — Rehana Perveen
*Assistant Examiner* — Scott A Waldron
(74) *Attorney, Agent, or Firm* — Workman Nydegger

(57) ABSTRACT

Data-driven configuration of various views on data models. A framework may be provided that offers one or more parameterized view generation components, each aimed at generating a particular view type in response to configuration data that populates the parameters of the associated component. A user or other computing entity merely provides configuration data to an appropriate view generation component to generate a custom view. That custom view may then optionally perhaps be applied to any number of data models, or perhaps not applied to any data model at all and just saved for perhaps some future use. This view generation may generate composite views on a data model, or even hierarchical views on a data model.

7 Claims, 6 Drawing Sheets

U.S. PATENT DOCUMENTS

| | | | |
|---|---|---|---|
| 6,232,984 B1 | 5/2001 | Chuah et al. | |
| 6,243,091 B1 | 6/2001 | Berstis | |
| 6,269,475 B1 | 7/2001 | Farrell et al. | |
| 6,335,745 B1 | 1/2002 | Amro et al. | |
| 6,405,216 B1 | 6/2002 | Minnaert | |
| 6,558,431 B1 | 5/2003 | Lynche | |
| 6,717,589 B1 | 4/2004 | Grillo et al. | |
| 6,806,887 B2 | 10/2004 | Chernock et al. | |
| 6,851,107 B1 | 2/2005 | Coad | |
| 6,985,876 B1 | 1/2006 | Lee | |
| 6,986,103 B1 | 1/2006 | Beezer | |
| 6,995,768 B2 | 2/2006 | Jou et al. | |
| 7,007,029 B1 | 2/2006 | Chen | |
| 7,110,936 B2 | 9/2006 | Hiew | |
| 7,155,678 B2 * | 12/2006 | Cooper et al. | 715/744 |
| 7,196,712 B2 | 3/2007 | Rajarajan et al. | |
| 7,240,296 B1 | 7/2007 | Matthews | |
| 7,272,815 B1 | 9/2007 | Eldridge et al. | |
| 7,370,315 B1 | 5/2008 | Lovell et al. | |
| 7,596,611 B1 | 9/2009 | Satish | |
| 7,712,042 B2 | 5/2010 | Hernandez-Sherrington | |
| 7,743,330 B1 | 6/2010 | Hendricks | |
| 2001/0028368 A1 | 10/2001 | Swartz et al. | |
| 2002/0099584 A1 | 7/2002 | Findley | |
| 2002/0109717 A1 | 8/2002 | Li | |
| 2002/0158864 A1 | 10/2002 | Matichuk | |
| 2003/0033284 A1 * | 2/2003 | Warren et al. | 707/1 |
| 2003/0043200 A1 | 3/2003 | Faieta et al. | |
| 2004/0027388 A1 | 2/2004 | Berg | |
| 2004/0036718 A1 | 2/2004 | Warren | |
| 2004/0122791 A1 | 6/2004 | Sea et al. | |
| 2005/0114778 A1 | 5/2005 | Branson et al. | |
| 2005/0187930 A1 | 8/2005 | Subramanian et al. | |
| 2005/0210412 A1 | 9/2005 | Matthews | |
| 2005/0210445 A1 | 9/2005 | Gough et al. | |
| 2006/0015817 A1 | 1/2006 | Fioretti | |
| 2006/0112123 A1 | 5/2006 | Clark et al. | |
| 2006/0168182 A1 | 7/2006 | Fuller et al. | |
| 2006/0200476 A1 | 9/2006 | Gottumukkala | |
| 2006/0224997 A1 | 10/2006 | Wong | |
| 2006/0294474 A1 | 12/2006 | Taylor et al. | |
| 2007/0061758 A1 | 3/2007 | Manson | |
| 2007/0106974 A1 | 5/2007 | Chafe et al. | |
| 2007/0130193 A1 | 6/2007 | McNally | |
| 2007/0136333 A1 | 6/2007 | Hassan | |
| 2007/0214173 A1 | 9/2007 | Ohashi | |
| 2007/0299823 A1 | 12/2007 | Getsch | |
| 2008/0196015 A1 | 8/2008 | Bekelman | |
| 2009/0193037 A1 * | 7/2009 | Yu et al. | 707/100 |
| 2009/0287724 A1 | 11/2009 | Murray | |

OTHER PUBLICATIONS

R. Ian Bull and Jean-Marie Favre Visualization in the Context of Model Driven Engineering http://webhome.cs.uvic.ca/~chisel/pubs/irbull_mddaui.pdf.

Margaret-Anne Storey, Casey Best, Jeff Michaud, Derek Rayside, Marin Litoiu, Mark Musen SHriMP Views: An Interactive Environment for Information Visualization and Navigation http://sigchi.org/chi2003/docs/shrimp.pdf.

Flavius Frasincar, Alexandru Telea, and Geert-Jan Houben Adapting graph visualization techniques for the visualization of RDF data http://wwwis.win.tue.nl/~houben/respub/vsw2005.pdf.

Getting to Know Simile the Visual Modeling environment for ecological, Biological and Environmental Research http://www.simulistics.com/documents/Simile.pdf (42 pages).

Process Component Models: The Next Generation in Windowflow http://www.infoq.com/articles/process-component-models (17 pages).

U.S. Appl. No. 12/121,485, filed Sep. 17, 2010, Office Action.
U.S. Appl. No. 11/674,109, filed Jun. 25, 2010, Office Action.
U.S. Appl. No. 11/674,109, filed Oct. 5, 2010, Notice of Allowance.
U.S. Appl. No. 12/121,485, filed Jan. 18, 2011, Office Action.
U.S. Appl. No. 12/121,485, filed May 23, 2011, Office Action.

* cited by examiner

US 8,140,581 B2

CONFIGURABLE VIEW ON DATA MODELS

BACKGROUND OF THE INVENTION

Data models define a collection of components and potentially also the interrelationships between those components. The components may be any definable entity, and the relationship between the components may be any definable relationship. Data models are not limited to defining software components such as objects in an object-oriented program. Components in the data model may also be representations of people (in the case of, for example, an organizational hierarchy data model), steps or flows (in the case of a process data model), cash credits or debits (in the case of a balance sheet data model), and so forth for a potentially unlimited variety of data models. The nature of the components will often depend on the nature of the data model itself.

The various components of a data model may have various associated attributes. Furthermore, each component might have various relationship types with other components of the data model. In order to gain a reasonable intuition on a particular data model, it is helpful to have a particular visual representation (or view) of the data model. However, some views may emphasize particular attributes, and perhaps particular relationship types, but may unintentionally deemphasize other attributes and relationship types.

When a developer designs a computer-implemented view of a data model, the developer may program software that illustrates what is applied to a particular data model to show a particular view of the particular data model. However, to do that, the developer might go through detailed coding processes and labor associated with developing that computer-implemented view. Alternatively or in addition, the view may be limited to only one particular view of the data, and have limited configurability.

BRIEF SUMMARY OF THE INVENTION

Although not required, some embodiments described herein relate to the configurability of various views on data models. A framework may be provided that offers one or more parameterized view generation components, each aimed at generating a particular view type in response to configuration data that populates the parameters of the associated component. Accordingly, a user or other computing entity merely provides configuration data to an appropriate view generation component to generate a custom view. That custom view may then optionally be applied to any number of data models, or perhaps not applied to any data model at all and just saved for some future use.

In one embodiment, a composite viewer may be generated that includes various different views on a data model, allowing the user to simultaneously view the data model from different perspectives thereby potentially gaining further insight and understanding as compared to just viewing the data model through one view.

Alternatively, or in addition, a composite view of a data model may be embedded in yet another composite view to generate a hierarchical structure of views. In one embodiment, the highest layer of that hierarchy might even be an entire application, or even perhaps an operating system.

This Summary is not intended to identify key features or essential features of the claimed subject matter, nor is it intended to be used as an aid in determining the scope of the claimed subject matter.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments described herein relate to a data-driven configuration of various views on data models. First, some introductory discussion regarding a computing system in which the principles described herein may be employed will be described with respect to FIG. 1. Then, various embodiments of the configuration of various views on data models will be described with respect to FIGS. 2 through 7.

Figure 1:
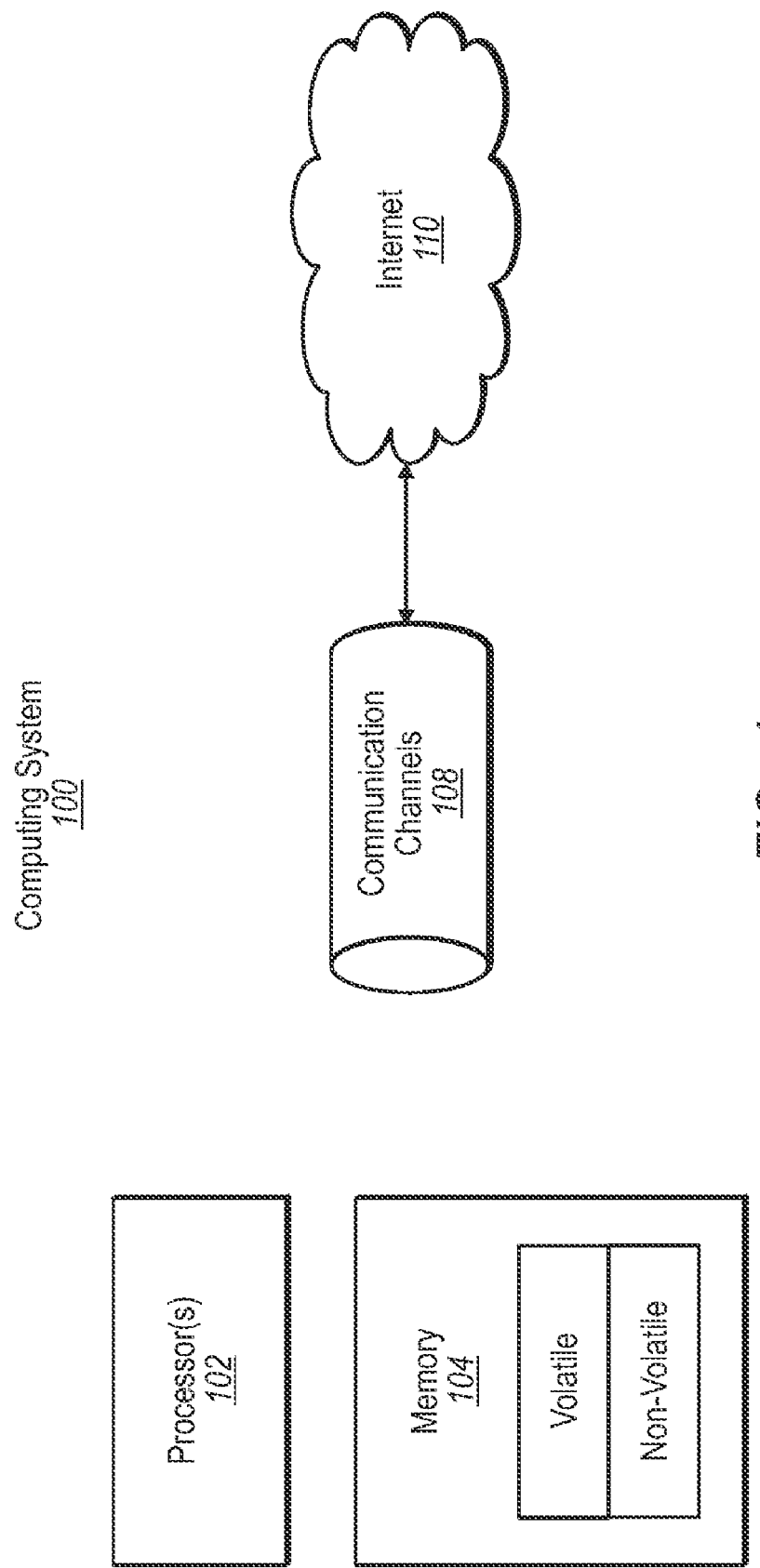
FIG. 1 illustrates a computing system in which embodiments described herein may operate.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not been conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
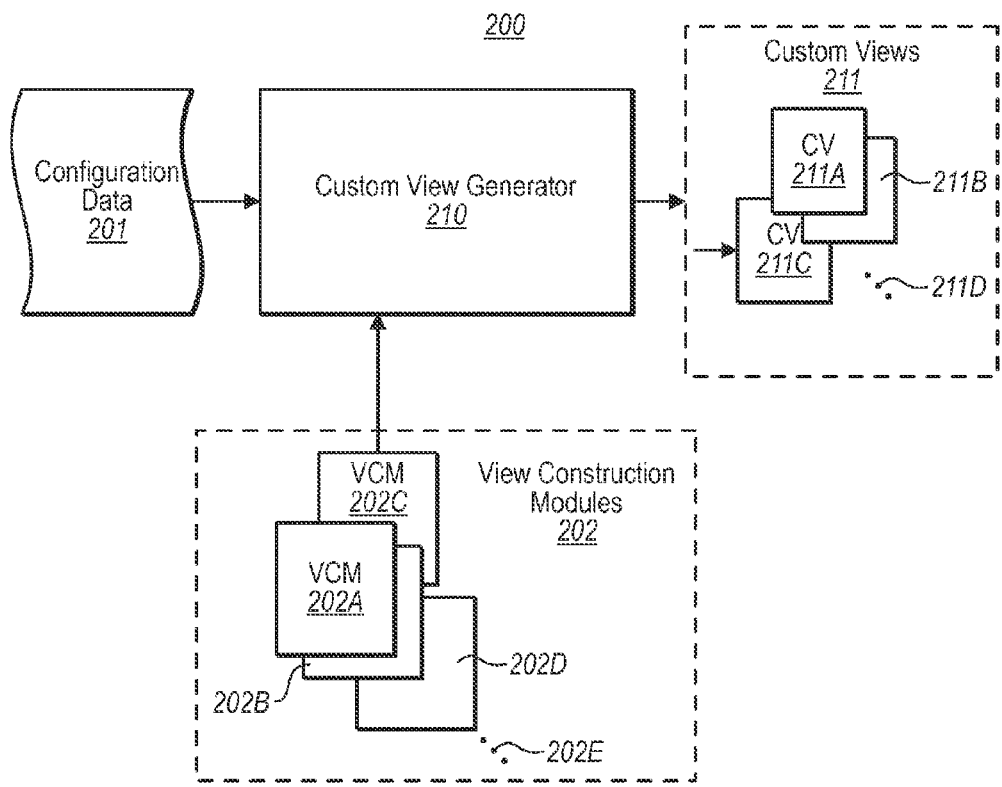
FIG. 2 illustrates a message processing environment that represents just one of many environments in which the principles described herein may operate.

FIG. 2 illustrates a configurable view generation environment 200 in which the principles described herein may be employed. The environment 200 may be incorporated within the computing system 100 of FIG. 1. The configurable view generation environment may generate a custom view that may then be applied to any number of data models. There are a limitless variety of data models, each having particular component type(s). For instance, a data model might be a process in which the components are steps in that process, an organizational chart in which the components are resources or employees, a computer program in which the components are modules, an inventory in which the components are individual items or classes of items in that inventory, a representation of the solar system in which each of the components is a representation of a sun, a planet, a moon, or the like.

The possibilities are limitless for what a data model might be. The principles described herein may be applied wherever different users might want different views of a data model. For instance, in a process data model in which the components are steps, some individuals (such as general contractors) might want a view that emphasizes which steps are dependent on completion of other steps, and that emphasizes a representation of a time required for each step to complete. The contractor or another user might want a view that emphasizes which steps have been completed, which are in process, and which are not started. If the data model were the solar system, a scientist might want a realistic scaled view of the solar system, perhaps one that outlines the orbit of the various planets. Another view on the solar system might artificially enlarge the representation of the various planets so that they might be more easily viewed by schoolchildren who are being taught about the solar system. For any given data model, a user might want to easily switch their view of the data model from one custom view to another, or even perhaps view multiple custom views of the data model simultaneously. Having given this example, the principles described herein may apply to any data model, and to any configurable view on that data model.

The process of formulating a custom view is data driven. The user or some other human or computing entity may set configuration data 201 that defines how the custom view will be constructed. The configuration data 201 is one of the inputs to the custom view generator 210. The configuration data 201 may be all provided at once, or may be provided at different times during the custom view construction process. In one embodiment, the configuration data 201 is declarative.

The type of configuration data 201 might not be standardized, but may differ according to the type of custom view to be generated. There are a variety of view construction modules 202 that might each correspond to a particular custom view type. There might be numerous view construction modules 202 available to the custom view generator 210. However, in FIG. 2, there are only four view construction modules 202A, 202B, 202C and 202D illustrated. The ellipses 202E represents, however, that there may be fewer than this number, or more that this number—perhaps many more.

Figure 3:
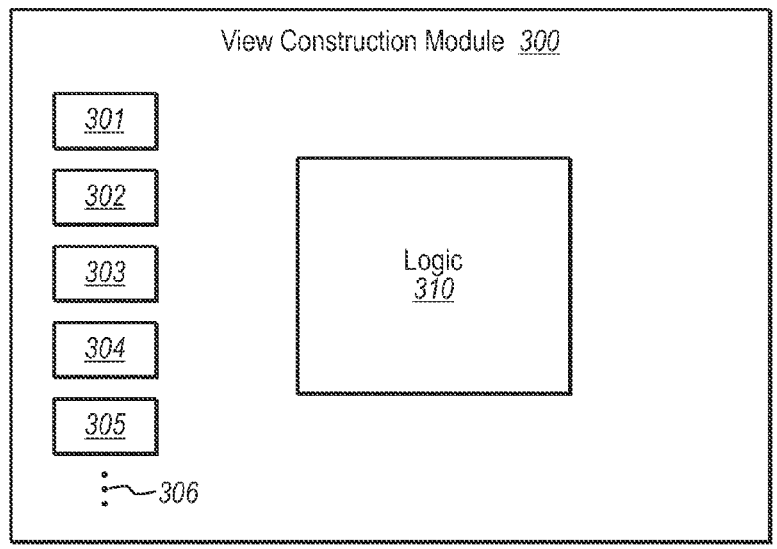
FIG. 3 schematically illustrates a view construction module of FIG. 2.

Referring to FIG. 3, a view construction module 300 is schematically illustrated. The view construction module 300 includes various parameters that might depend on the type of custom view that the view construction module 300 may correspond to. In this specific example, the view construction module 300 is illustrated as including five parameters 301, 302, 303, 304 and 305. However, the number of parameters may differ according to the custom view, and according to the degree to which that custom view has been parameterized. Accordingly, the ellipses 306 represents that there may be other types of views as well.

The parameters of the view construction module 300 may be populated by the configuration data 201 if the view construction module 300 is to be used to generate a custom view. The logic 310 of the view construction module 300 may then be used with the various populated parameters as inputs to define underlying behavior of the view. For instance, if the custom view was to be a flowchart of the process data model in which the components were steps, a parameter might be whether dependencies are to be shown, a designation of the symbol types that are to be used to represent the various step times (e.g., conditional branching, start and stop steps, and others), whether there are certain conditions to be applied such as minimizing certain steps if the number of steps exceeds a certain number, and the like. Accordingly, the configuration may be a property of a view (e.g., background color), but may also include a condition that affects the behavior of a view, and that may potentially require further information before the structure of the custom view may be known. For instance, if there are more than 20 components in a data model, a different view entirely may be used to represent that view as compared to there being 20 or less components in the data model.

Referring back to FIG. 2, the custom view generator 210 receives the configuration data 201, selects an instance of an appropriate view construction module 202 (e.g., view construction module 202C), and populates the various parameters of the view construction module 202C with information from the configuration data. This results in a custom view 211C being generated, which may then be provided to a library of custom views 211. In FIG. 2, three custom views 211A, 211B and 211C are illustrated as being included in the custom view library 211. However, there may be other numbers as represented by the ellipses 211D. The custom views may later be applied to one or more data models to thereby create an actual view of a data model. The custom views 211 may each contain the logic of the corresponding view construction module from which the custom view was constructed, with one or more or all of the corresponding parameters being now populated by the configuration data.

Figure 4:
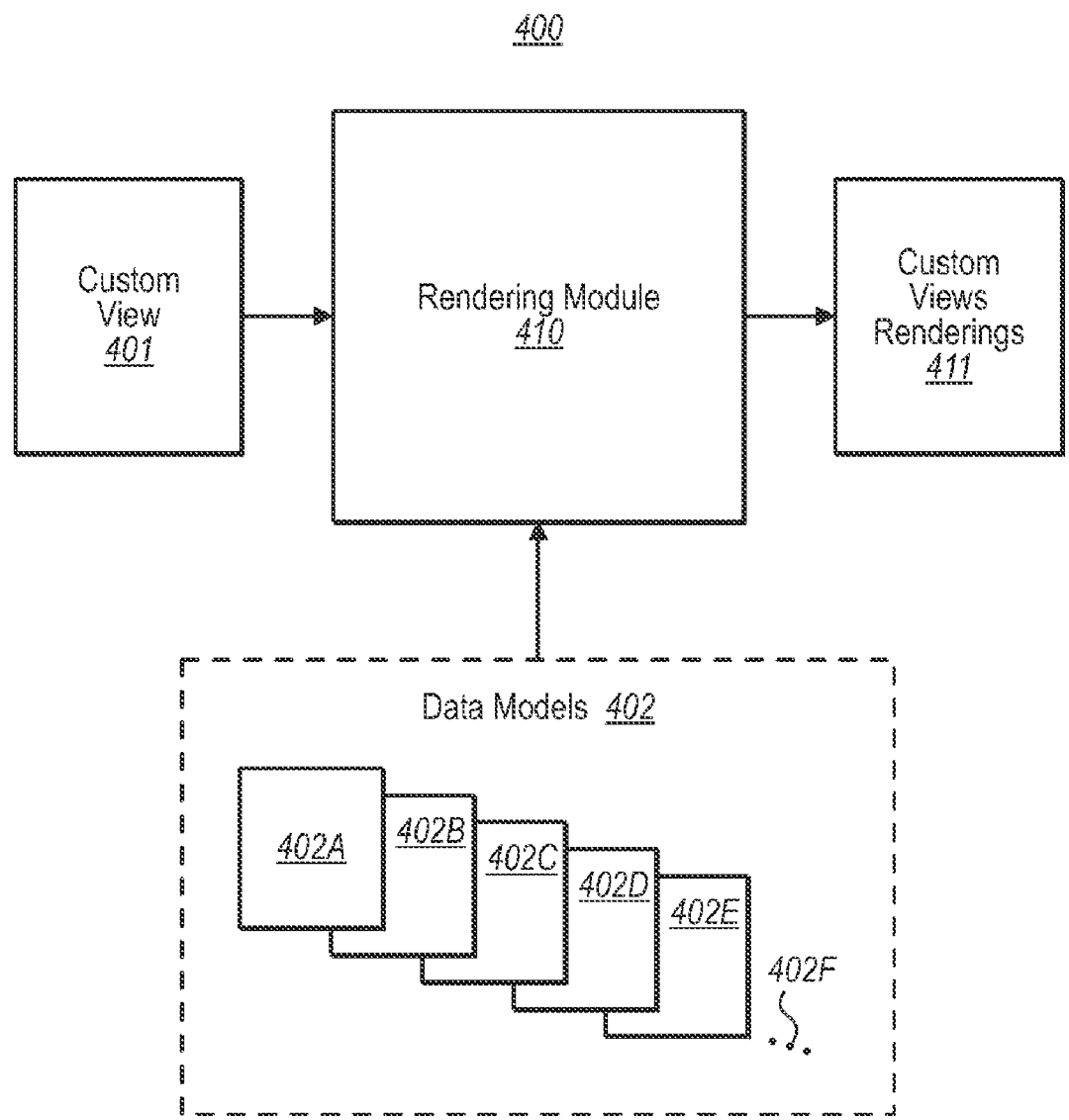
FIG. 4 illustrates a rendering environment in which a custom view is to be used by a rendering module to render views of one or more selected data models.

FIG. 4 illustrates a rendering environment 400 in which a custom view is used by a rendering module 410 to render views 411 of one or more selected data models 402. A single custom view may be used to render multiple data models. For instance, the custom view 401 may be used to render any one or all of the data models 402. The data models are illustrated as including five data models 402A, 402B, 402C, 402D and 402E. However, the ellipses 402F represents that there may be library of more or less than this number of data models. Accordingly, not only might a user configure multiple views, but those custom views may each be applied to any one or more data models.

Figure 5:
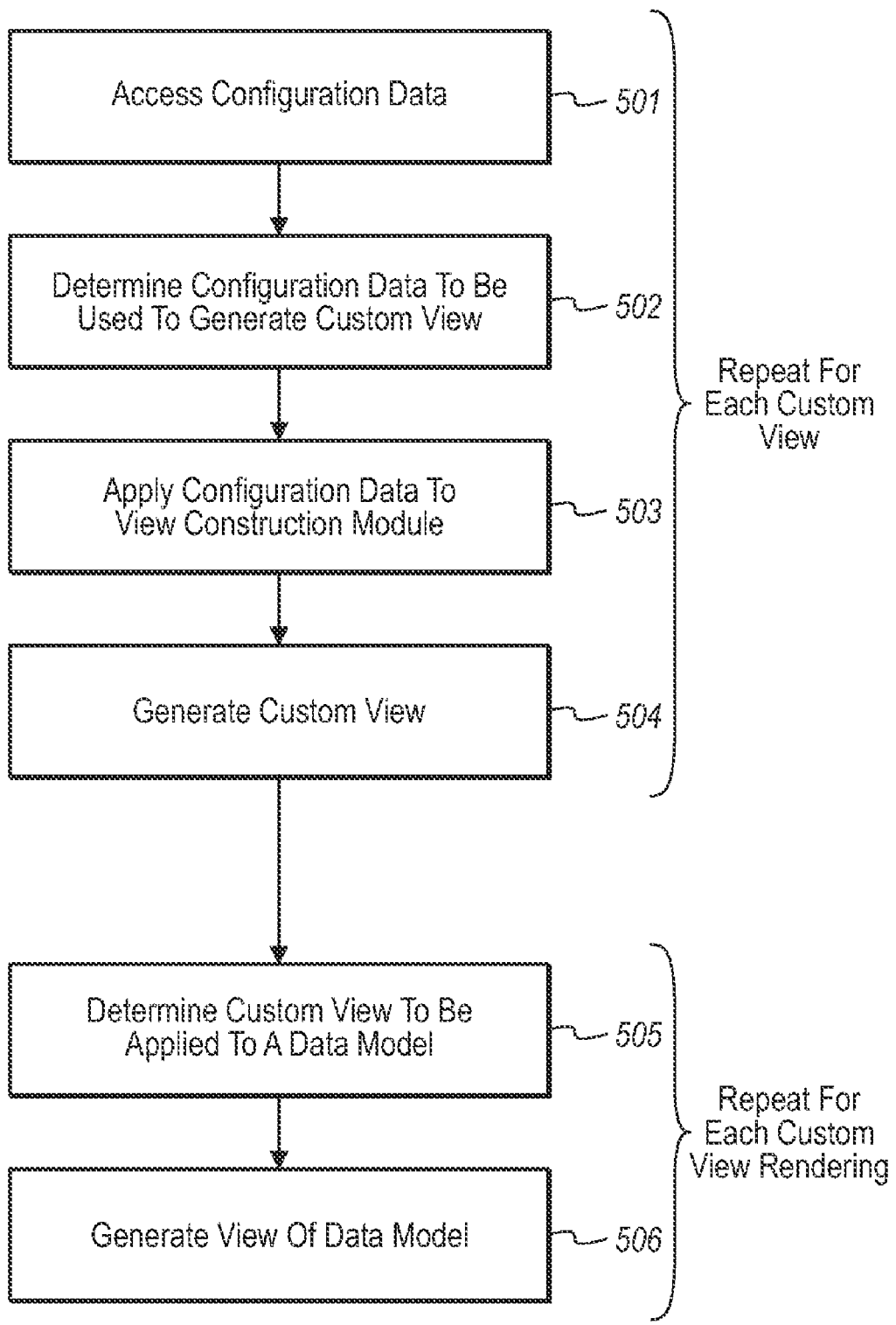
FIG. 5 illustrates a flowchart of a method for formulating a custom view that may be applied to data models.

FIG. 5 illustrates a flowchart of a method 500 for formulating a custom view that may be applied to data models. In the first stage of the method 500, the custom view is constructed as represented by the acts 501, 502, 503 and 504. Such acts may be performed for each custom view to be generated. In the second stage of the method 500, which might occur at any point after the first stage, the custom view as applied to a data model to render a view of the data model. This second stage is represented by acts 505 and 506, and may be repeated whenever a custom view is to be applied to a data model to render a view of the data model.

The configuration data is accessed (act 501). For instance, in FIG. 2, the configuration data 201 is accessed by the custom view generator 210. User input might then designate that the configuration data is to be applied to generate a custom view (act 502. Alternatively, there might be some other triggering mechanism for determining that the configuration data is to be used to generate a custom view.

The configuration data is then applied as one or more parameter to a corresponding view construction module (act 503). In FIG. 2, for example, the configuration data 201 may be applied to the parameters of the view construction module 202C. This results in the generation of a custom view (act 504) that may be applied to any one or more of the available data models. For instance, in FIG. 2, the custom views 211 were generated by the custom view generator 210 by applying the configuration data 201 to one or more of the view construction modules 202.

Thereafter, user input may be detected designating that the custom view is to be applied to a data model to generate a custom view of the data model (act 505). Alternatively, some other triggering mechanism might be used to determine that a custom view is to be applied to a data model. This results in the generation of a custom view of the data model (act 506).

Figure 6:
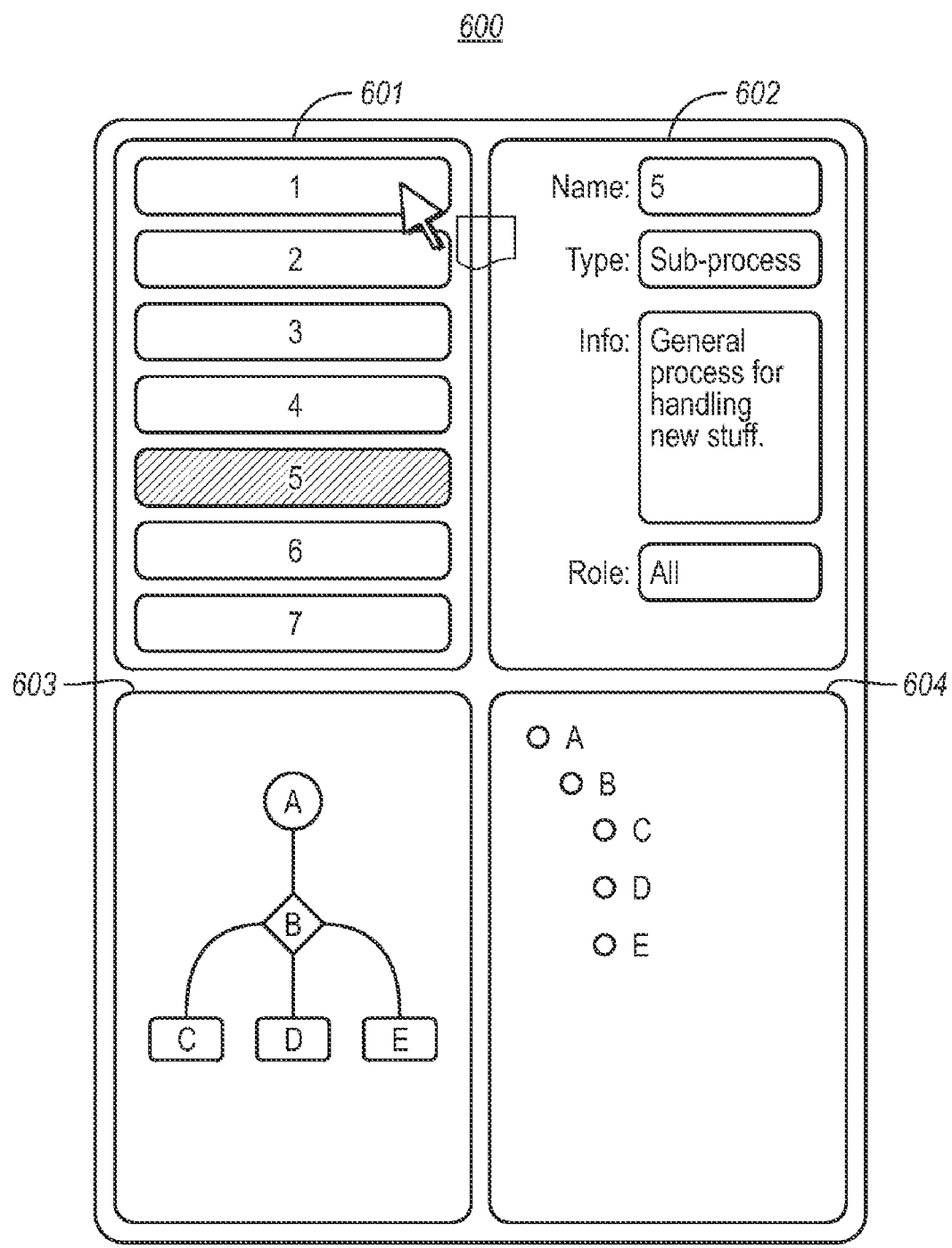
FIG. 6 illustrates a user interface that may result from this generation of a composite view.

Some of the custom views may represent composite views formulated as a collection of one or more other custom views. For instance, FIG. 6 illustrates a user interface 600 that may result from this generation of a composite view. The user interface 600 includes three custom view renderings 602, 603 and 604, for the same data model. The custom view rendering 602 in the upper right corner lists the various properties of the data model. In this case, the data model named "5", is of type "sub-process", and has certain information and roles also illustrated in the properties view 602. A flow view 603 is illustrated in the lower left corner and illustrates the process as a flow chart. A tree view 604 is illustrated in the lower right corner and illustrates the process data model as a tree structure.

The upper left corner represents a master view 601 that illustrates a representation of all of the data models that the composite custom view may be applied to. In this case, the fifth data model is selected. If another data model is selected in the master view 601, the detail views 602 through 604 would show views of a different data model. The physical relationship of the various views of the composite view may also be configurable.

The views may be applied hierarchically. For instance, in FIG. 6, there is a two level hierarchy of custom views illustrated. The detail views 602 through 604 each represent a first level in the hierarchy. Accordingly, each of the detail views 602 through 604 may have been generated by applying a different custom view to the same data model. Accordingly, the composite view 600 represents a composite view of a data model. This composite model may be augmented.

Figure 7:
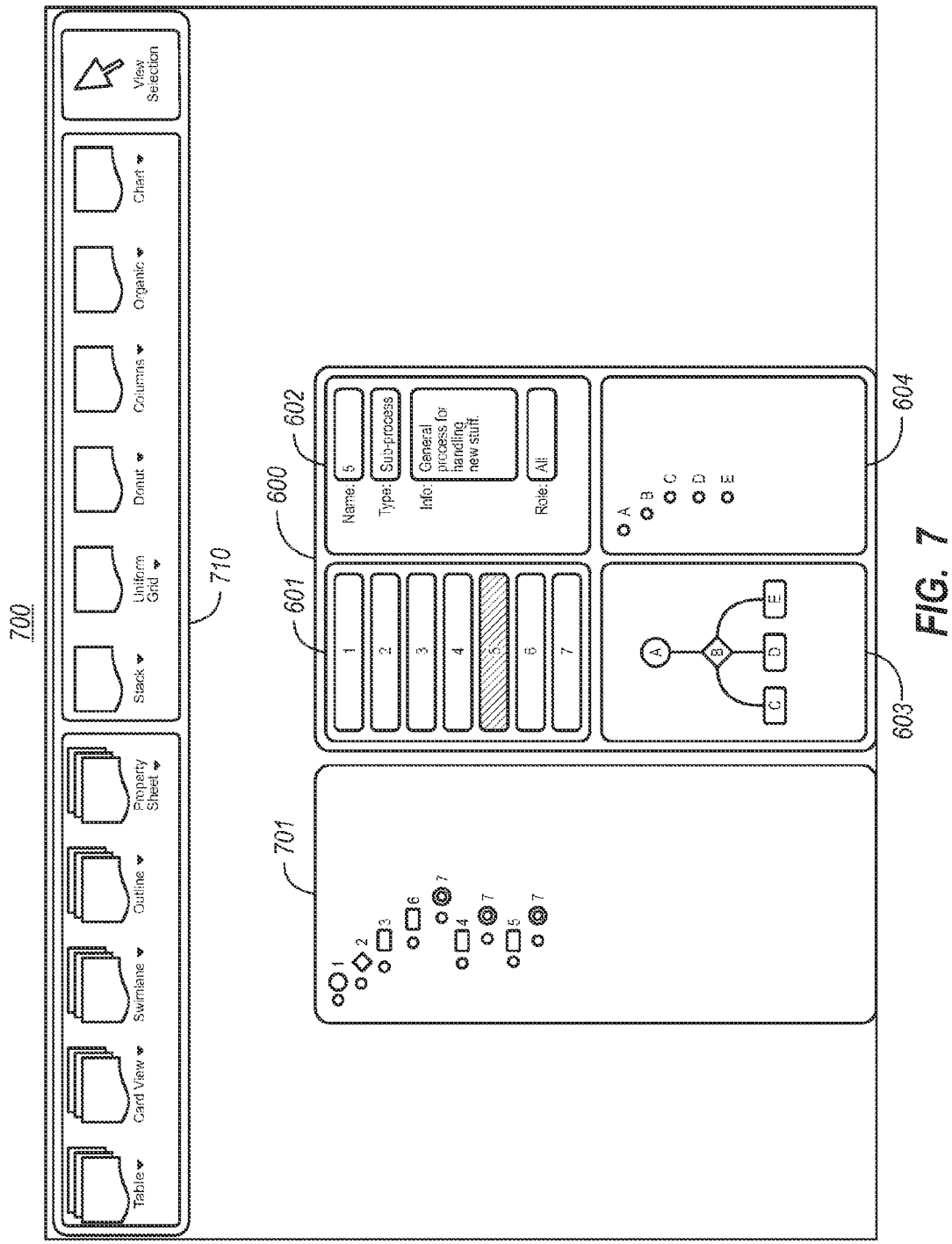
FIG. 7 illustrates a user interface that may be used to augment the composite view of the data model.

FIG. 7 illustrates a user interface 700 that may be used to augment the composite view of the data model. In this example, some type of user interaction (e.g., a drag and drop from the custom view selection banner 710) causes the selected custom view to be applied to the data model, and relatively positioned with the prior composite custom view of the data model. In FIG. 7, an augmented tree view 701 of the same data model is now illustrated. In this case, the selection of the augment tree custom view from the selection banner 710 was the indication to the system that that custom view is to be applied to the data model. Accordingly, the composite custom view of the data model now includes four detail views 602, 603, 604 and 701. In a similar way, a custom view of a data model may be deleted by perhaps dragging and dropping a custom view off of the display.

In FIG. 7, the composite view (represented by the aggregation of views 600 and 701) might itself be a component of a data model, with perhaps the entire display 700 being yet another custom view of a data model. The entire display 700, however, is applied to a different model. Specifically, the data model is a list of the various custom views and a corresponding edit area. The banner 710 and its positioning at the top of the display may be the result of a particular custom view applied to the custom view data model. That custom view might also provide an edit area where the composite view 600 and 701 may be operated upon. An entire application may be defined using a higher-level custom view. Thus, when one purchases an application, a user might be able to configure the high-level custom view on the data model representing that application so that the application is rendered as the user wishes.

Accordingly, embodiments have been described in which various views of data models may be generated in a configurable way. An intermediary programmer or even a user may thus be able to quickly define and change various views on a data model. This flexibility allows for the generation of views in a manner that is more tailored for a particular application or user.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. A computer program product comprising physical memory for storing computer-executable instructions that, when executed by one or more processors of a computing system, cause the computing system to perform a method for generating one or more custom views for application to any of a plurality of data models when displaying one or more of the data models, the method comprising:

storing in a memory of the computing system configuration data that defines how one or more custom views will be constructed for one or more data models;

storing in the computing system memory a plurality of view construction modules that each correspond to a particular custom view, each view construction module comprising a plurality of parameters for defining behavior of a particular custom view, and each view construction module comprising logic for using the plurality of parameters to define the behavior of the view;

retrieving from memory the configuration data which is input to a custom view generator of the computing system;

the custom view generator then retrieving from memory at least one of the view construction modules and using the retrieved configuration data to populate the parameters for the at least one view construction module, the populated parameters of the at least one view construction module defining behavior of at least a first custom view;

inputting the first custom view to a rendering module of the computing system;

the rendering module retrieving from memory at least one of the stored data models; and the rendering module of the computing system presenting the retrieved data model in accordance with the first custom view, wherein the first custom view is a composite view of one or more other views presented in a hierarchy comprising at least a master view and at least one detail view.

2. A computer program product as defined in claim 1 wherein the method is comprised of:

the rendering module of the computing system retrieving from memory at least a second stored data model; and the rendering module of the computing system presenting the second retrieved data model in accordance with the first custom view.

3. A computer program product as defined in claim 1 wherein the method is comprised of:

the custom view generator of the computing system retrieving from memory at least one other view construction module and then using the retrieved configuration data to populate the parameters for the at least one other view construction module, the populated parameters of the at least one other view construction module defining behavior of a second custom view;

inputting the second custom view to the rendering module of the computing system;

the rendering module of the computing system retrieving from memory at least one of the stored data models; and the rendering module of the computing system presenting the retrieved data model in accordance with the second custom view.

4. A computer program product as defined in claim 1 wherein the method is comprised of:

the custom view generator of the computing system retrieving from memory at least one other view construction module and then using retrieved configuration data to populate the parameters for the at least one other view construction module, the populated parameters of the at least one other view construction module defining behavior of a second custom view;

inputting the second custom view to the rendering module of the computing system;

the rendering module of the computing system retrieving from memory at least one of the stored data models; and the rendering module of the computing system presenting the retrieved data model in accordance with both the first and the second custom views.

5. A computer program product as defined in claim 4 wherein the method is comprised of:

the rendering module of the computing system presenting in a user interface a display of a plurality of retrieved data models selected for presentation in accordance with a composite view that is comprised of both the first and the second custom views.

6. A method for generating one or more custom views for application to any of a plurality of data models stored in a memory of a computing system when using the computing system to display one or more of the data models, the method comprising:

storing in a memory of the computing system configuration data that defines how one or more custom views will be constructed for one or more data models;

storing in the computing system memory a plurality of view construction modules that each correspond to a particular custom view, each view construction module comprising a plurality of parameters for defining behavior of a particular custom view, and each view construction module comprising logic for using the plurality of parameters to define the behavior of the view;

retrieving from memory configuration data which is input to a custom view generator of the computing system;

the custom view generator then retrieving from memory at least one of the view construction modules and using the retrieved configuration data to populate the parameters for the at least one view construction module, the populated parameters of the at least one view construction module defining behavior of at least a first custom view;

inputting the first custom view to a rendering module of the computing system;

the custom view generator of the computing system retrieving from memory at least one other view construction module and then using retrieved configuration data to populate the parameters for the at least one other view construction module, the populated parameters of the at least one other view construction module defining behavior of a second custom view;

inputting the second custom view to the rendering module of the computing system;
the rendering module of the computing system retrieving from memory at least one of the stored data models; and
the rendering module of the computing system presenting the retrieved data model in accordance with both the first and the second custom views, wherein at least the first custom view is a composite view of one or more other views presented in a hierarchy comprising at least a master view and at least one detail view.

7. A method as defined in claim 6 wherein the data model is presented in accordance with a composite view that is comprised of the both the first and the second custom views.

\* \* \* \* \*